United States Patent
Chiang et al.

(10) Patent No.: US 7,869,202 B2
(45) Date of Patent: Jan. 11, 2011

(54) DETACHABLE BASE

(75) Inventors: Chin-Fu Chiang, Taipei County (TW); Chih-Kang Peng, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 860 days.

(21) Appl. No.: 11/806,790

(22) Filed: Jun. 4, 2007

(65) Prior Publication Data
US 2007/0279850 A1 Dec. 6, 2007

(30) Foreign Application Priority Data
Jun. 5, 2006  (TW) .............................. 95119921 A

(51) Int. Cl.
*H05K 7/12* (2006.01)

(52) U.S. Cl. .............................. 361/679.22; 361/679.21; 361/679.01; 248/917

(58) Field of Classification Search ............ 361/679.22, 361/679.21; 248/131, 521, 349.1, 917–924
See application file for complete search history.

(56) References Cited

U.S. PATENT DOCUMENTS

| | | | | |
|---|---|---|---|---|
| 3,936,026 A * | 2/1976 | Hampel et al. | ............ | 248/349.1 |
| 4,066,231 A | 1/1978 | Bahner et al. | | |
| 4,549,710 A * | 10/1985 | Prince et al. | ............. | 248/183.3 |
| 5,779,309 A * | 7/1998 | Lu | ......................... | 297/344.26 |
| 6,837,469 B2 * | 1/2005 | Wu et al. | ................. | 248/278.1 |
| 2006/0117623 A1 | 6/2006 | Watanabe | | |

FOREIGN PATENT DOCUMENTS

| | | |
|---|---|---|
| CN | 1447340 A | 10/2003 |
| CN | 1576968 A | 2/2005 |
| JP | 2005-208080 A | 8/2005 |
| TW | 539202 U | 6/2003 |
| TW | 587660 | 5/2004 |
| TW | M244714 Y | 9/2004 |
| TW | I233750 | 6/2005 |
| TW | M277025 U | 10/2005 |
| TW | M277209 | 10/2005 |
| TW | M277945 | 10/2005 |
| TW | M280625 U | 11/2005 |

\* cited by examiner

*Primary Examiner*—Jayprakash N Gandhi
*Assistant Examiner*—Ingrid Wright
(74) *Attorney, Agent, or Firm*—Birch, Stewart, Kolasch & Birch, LLP

(57) ABSTRACT

A detachable base, for supporting an object as a flat-panel display comprises a base-plate, a supporting pillar, and a connecting assembly. The base-plate has a positioning block disposed on an upper surface thereof. The positioning block has a fillister. The supporting pillar has an upper end and a lower end, the lower end of the supporting pillar is received in the fillister of the positioning block. The connecting assembly is connected with the object and has an accommodating space for receiving the supporting pillar and the positioning block when the connecting assembly is connected with the base-plate.

18 Claims, 7 Drawing Sheets

DETACHABLE BASE

BACKGROUND OF THE INVENTION (1) Field of the Invention

The invention relates to a detachable base, more particularly to a detachable base applied to a flat-panel display.

(2) Description of the Prior Art

Following the advancement of the display technique, the LCD TV and Plasma TV are widely used to substitute for the traditional CRT TV. The LCD TV is very popular by the consumer, since its light weight and small volume. The manufacturers worldwide have devoted themselves to further research and thus improve the materials, processes, and equipment. The qualities of the LCD TV are accordingly and largely promoted while the cost is decreased day-by-day so as to result in wide applications of the LCD TV.

With the advance of the LCD panel technique, the image quality is better, and the dimensions of the LCD panel are larger. On the other hand, the weight of the LCD TV is accordingly heavier when the dimensions of the panel are increasingly larger. Due to the shape of the LCD TV is flat, so it is very important that the base for supporting the LCD TV shall be strong enough.

Generally speaking, the base of the LCD TV comprises a bracket and a base-plate. Please refer to FIG. 1, which is a schematic top view of a bracket of the LCD TV in prior arts. The bracket 1 includes a connecting base 11 and a bearer 12. The connecting base 11 is to connect a back of a body of the LCD TV. The bearer 12 is disposed beneath the connecting base 11 for connecting the base-plate of the LCD TV.

Please refer to FIG. 2, which is a schematic bottom view of the bracket of the LCD TV in prior arts. The connecting base 11 is connected with the bearer 12 by a fastener 13, and then a flexible washer 131 is disposed between the fastener 13 and the bearer 12 so as to allow the connecting base 11 to rotate on the bearer 12.

However, there are some disadvantages in the above design. When the bracket 1 is mounted on the LCD TV, the bearer 12 is loaded by the total weight of the body of the LCD TV so as to cause the fastener 13 for connecting the bearer 12 and the connecting base 11 to be possibly bent. Therefore, due to the length of the fastener 13 is limited and the bending force is highly concentrated, thereby the bracket 1 is under a critical condition. Besides, the connecting base 11 is usually made of metal, which causes the EMI problems frequently.

A base-plate with a large area is to connect a lower end of the bracket 1 for providing better supporting ability. In general, the base-plate and the body of LCD TV are assembled firstly and then put in a box for delivering.

After the assembling procedure, the assembly of the body of LCD TV and the base-plate is shaped as a reverse "T". Such shape requires a large box for packaging and delivering, which causes the cost increased.

For decreasing the package volume, one method is to detach the body of the LCD TV from the base-plate, and then dispose and stack the body of the LCD TV and the base-plate in a cardboard box. It is noted that it is hardly to assemble or detach the body of the LCD TV and the base-plate by consumers, so the assembling procedures are usually completed in factories.

SUMMARY OF THE INVENTION

The primary objective of the present invention is to provide a detachable base. A user can detach and assemble the detachable base easily so as to reduce the package volume.

The present invention provides a detachable base for supporting an object. The detachable base comprises a base-plate, a supporting pillar, and a connecting assembly.

Wherein the base-plate has a positioning block disposed an upper surface thereof, the positioning block has a fillister. The supporting pillar has an upper end and a lower end, the lower end is received in the fillister of the positioning block alternatively.

The connecting assembly is connected with the object and has a accommodating space for receiving the supporting pillar and the positioning block when the connecting assembly are connected with the base-plate.

A flat-panel display of the present invention comprises a body and a detachable base.

Wherein the detachable base further comprises a base-plate, a supporting pillar, and a connecting assembly. The base-plate has a positioning block disposed on an upper surface thereof, the positioning block has a fillister. The supporting pillar has an upper end and a lower end, the lower end is received in the fillister of the positioning block alternatively. The connecting assembly is connected with the body and has a accommodating space for receiving the supporting pillar and the positioning block when the connecting assembly are connected with the base-plate.

The assembling process comprises the following steps of: (1) the connecting assembly being connected to the body of the object, and the lower end of the supporting pillar being inserted into the fillister of the base-plate; and (2) the supporting pillar and the positioning block of the base-plate being inserted into the accommodating space of the connecting assembly in sequence.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The present invention provides a detachable base for supporting an object such as flat-panel display. The detachable base provides a great structural strength to support a body of the flat-panel display, and a base-plate of the base can be easily detached from the body of the flat-panel display so as to decrease the package volume. The detailed description of the present invention is as follows.

Figure 3A:
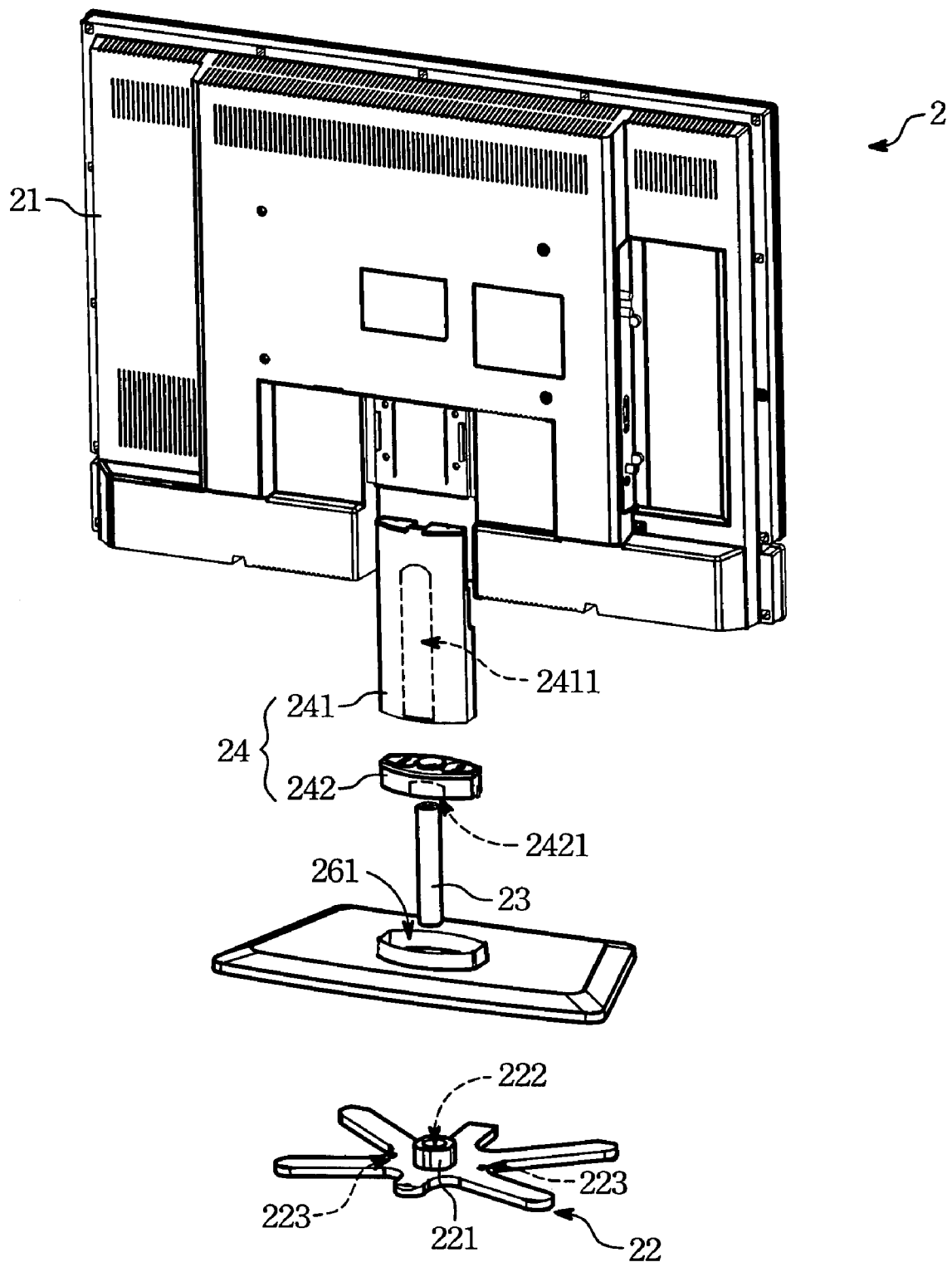
FIG. 3A illustrating an exploded view of a flat-panel display of the present invention.

Please refer to FIG. 3A, FIG. 3A is an exploded view of a flat-panel display of the present invention. FIG. 3A shows the detachable base for connecting a back of the body 21 of the flat-panel display 2 comprises a base-plate 22, a supporting pillar 23, and a connecting assembly 24.

The base-plate 22 of the detachable base has a positioning block 221 disposed an upper surface thereof, and the positioning block 221 further has a fillister 222. Wherein the base-plate 22 and the positioning block 221 can be integrated as a whole structure. The supporting pillar 23 has an upper end and a lower end, the lower end is received in the fillister 222 of the positioning block 221 alternatively.

The connecting assembly 24 is connected with the body 21 of flat-panel display 2 and connected to the back of the body 21 of the flat-panel display 2. The connecting assembly 24 has an accommodating space for receiving the supporting pillar 23 and the positioning block 221, and an opening is located at a lower end of the connecting assembly 24. The positioning block 221 and the supporting pillar 23 are received in the accommodating space when the connecting assembly 24 are connected with the base-plate 22. In other words, The supporting pillar 23 and the positioning block 221 of the base-plate 22 can be inserted into the accommodating space of the connecting assembly 24 in sequence. After the supporting pillar 23 and the positioning block 221 are received into the accommodating space, a bottom of the connecting assembly 24 is thus connected to the base-plate 22.

Figure 4:
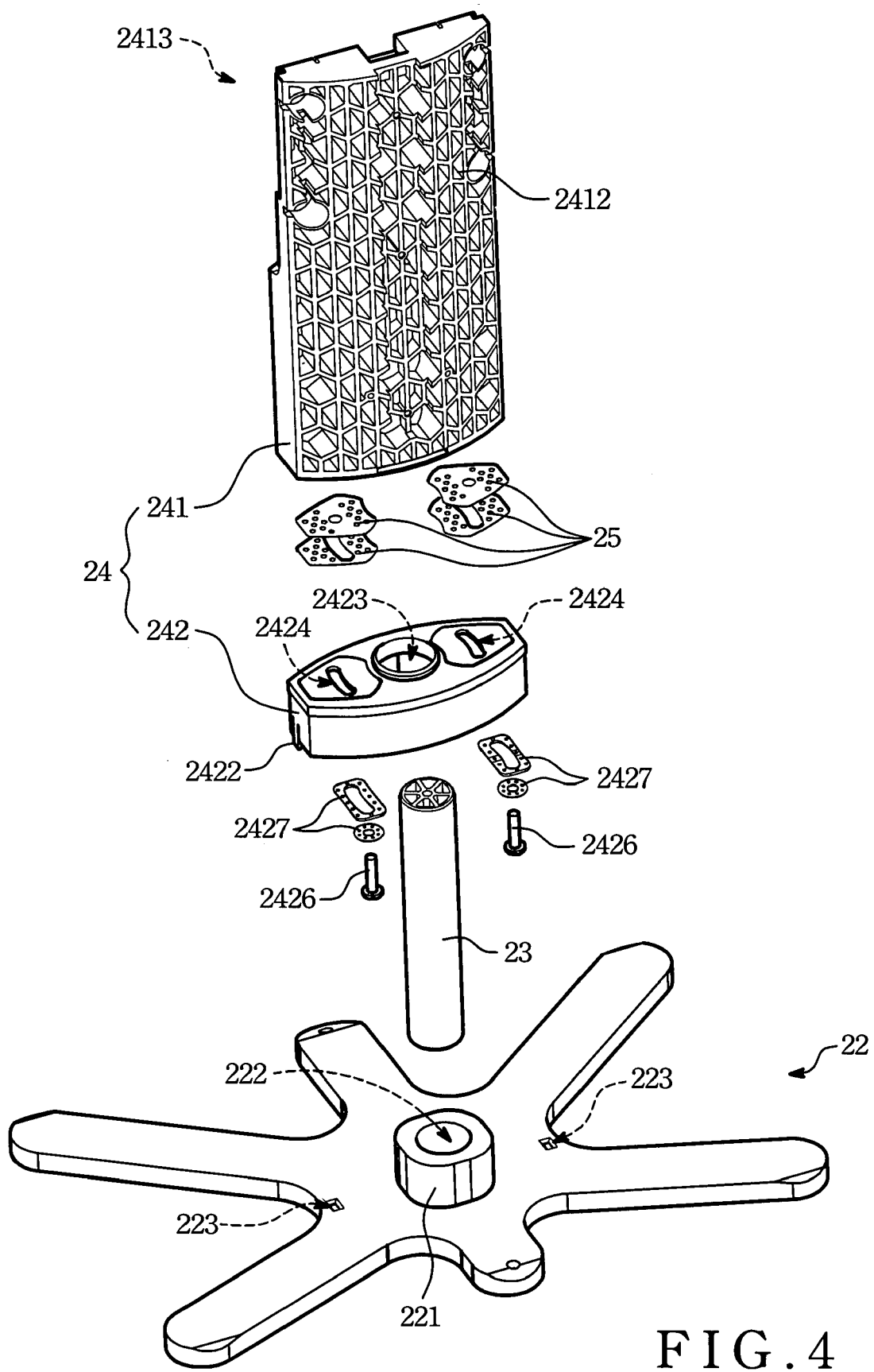
FIG. 4 illustrating an exploded view of a detachable base of the present invention.

Please refer to FIG. 3A and FIG. 4. FIG. 4 is an exploded view of the detachable base of the present invention. Both illustrations show that the connecting assembly 24 comprises the connecting base 241 and the bearer 242.

Figure 5:
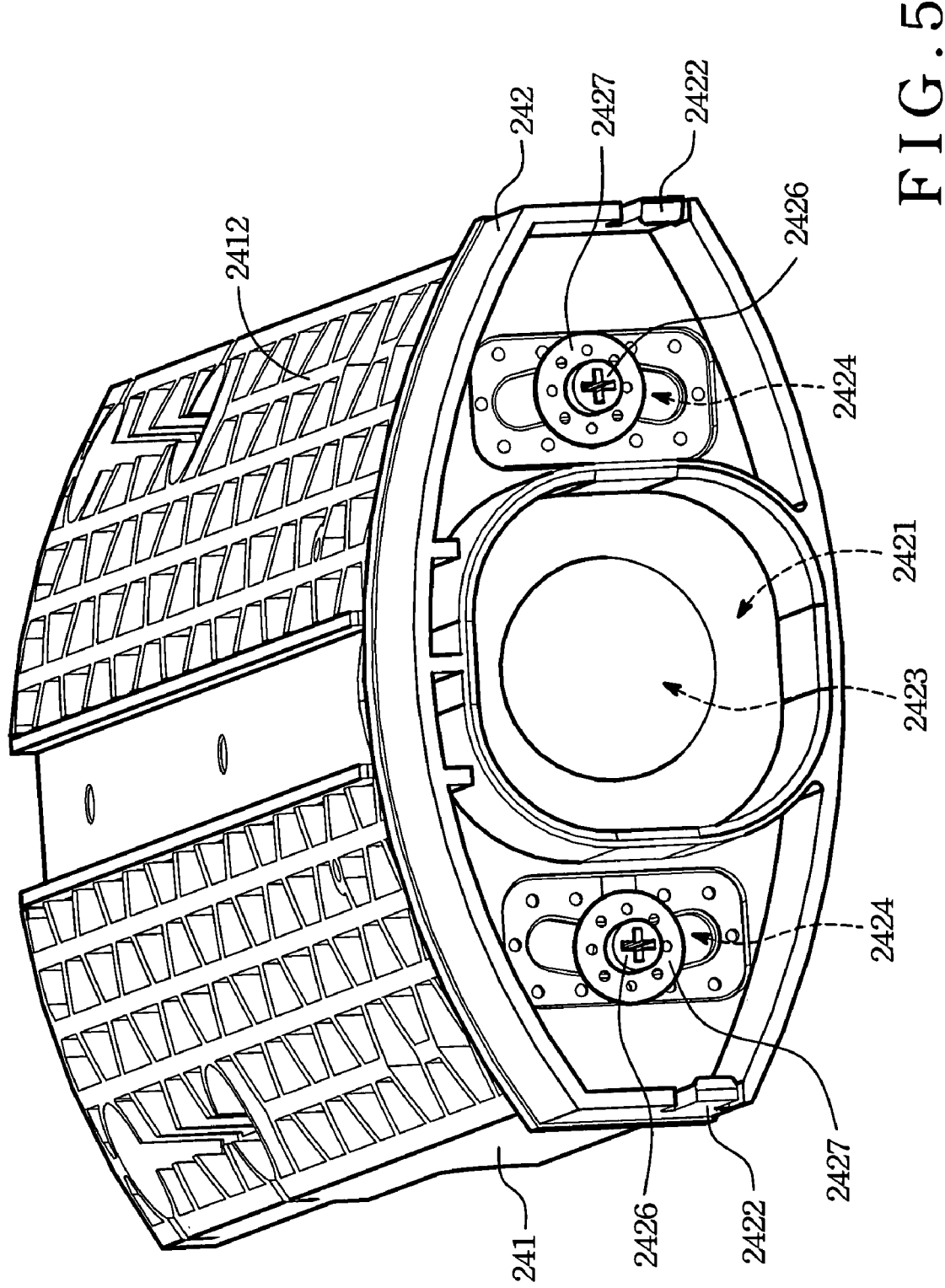
FIG. 5 illustrating a bottom view of a connecting assembly of the present invention.
Figure 6:
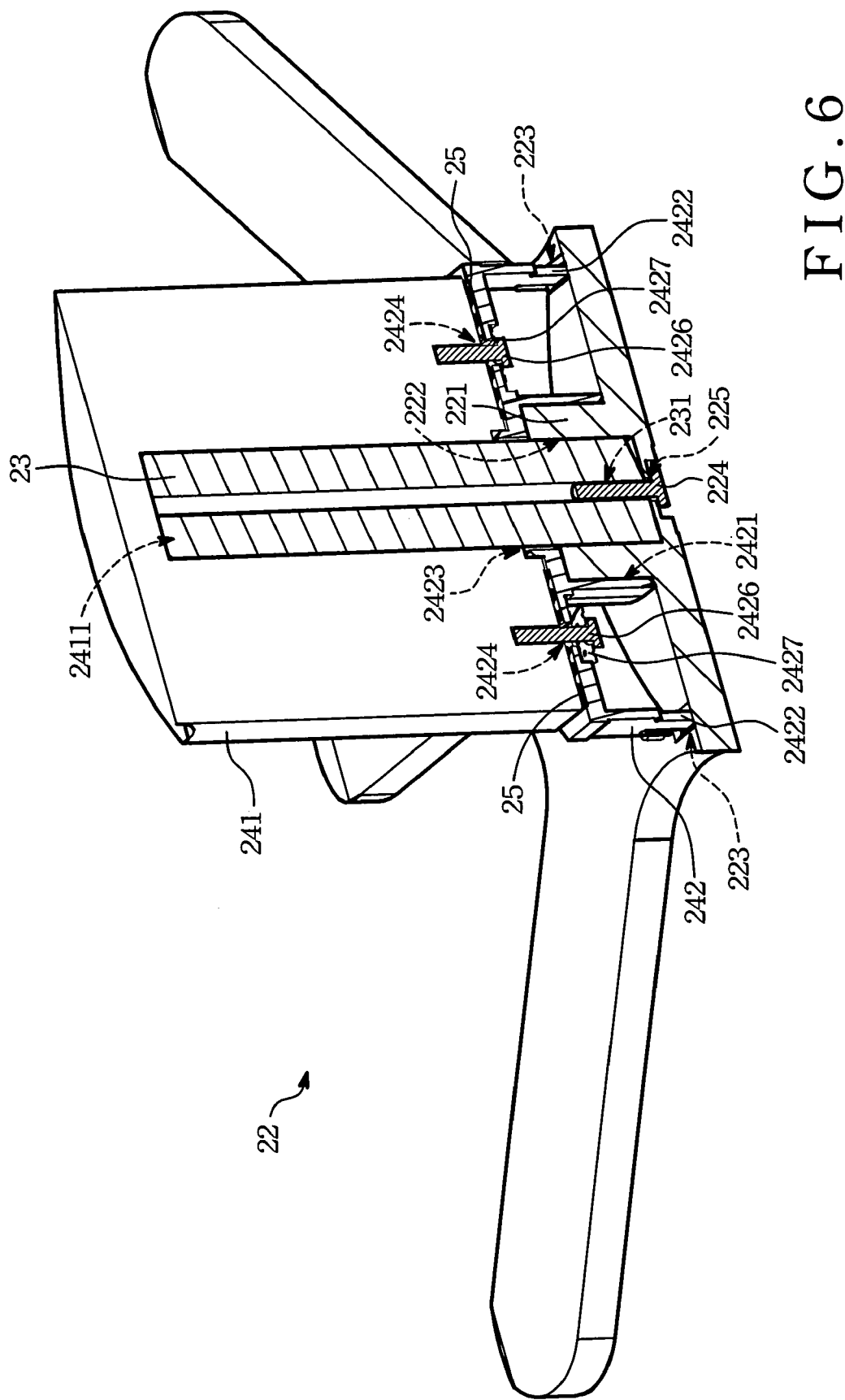
FIG. 6 illustrating a cross-sectional view of the detachable base of the present invention.

Please refer to FIG. 5 and FIG. 6 simultaneously, which are a bottom view of the connecting assembly of the present invention and a cross-sectional view of the detachable base of the present invention. The bearer 242 has a positioning chute 2421 opened downward for receiving the positioning block 221, wherein the positioning chute 2421 is a part of the accommodating space of the connecting assembly 24. The positioning block 221 is accommodated in the positioning chute 2421 so as to restrict the rotation of the bearer 242 corresponding to the base-plate 22.

Please refer to FIG. 4, the bearer 242 has a hook 2422, and the base-plate 22 has a slot 223. The hook 2422 buckles up the slot 223 to joint the bearer 242 with the base-plate 22 when the bearer 242 is disposed on the base-plate 22, that is, the positioning block 221 is received in the positioning chute 2421. In a preferred embodiment, there are two hooks 2422 disposed both sides of a bottom of the bearer 242, and two slots 223 is disposed on the base-plate 22. Continuously, the two hooks 2422 can buckle up the two slots 223. Besides, the bearer 242 has a first through hole 2423 for interlinking with the positioning chute 2421.

Figure 1:
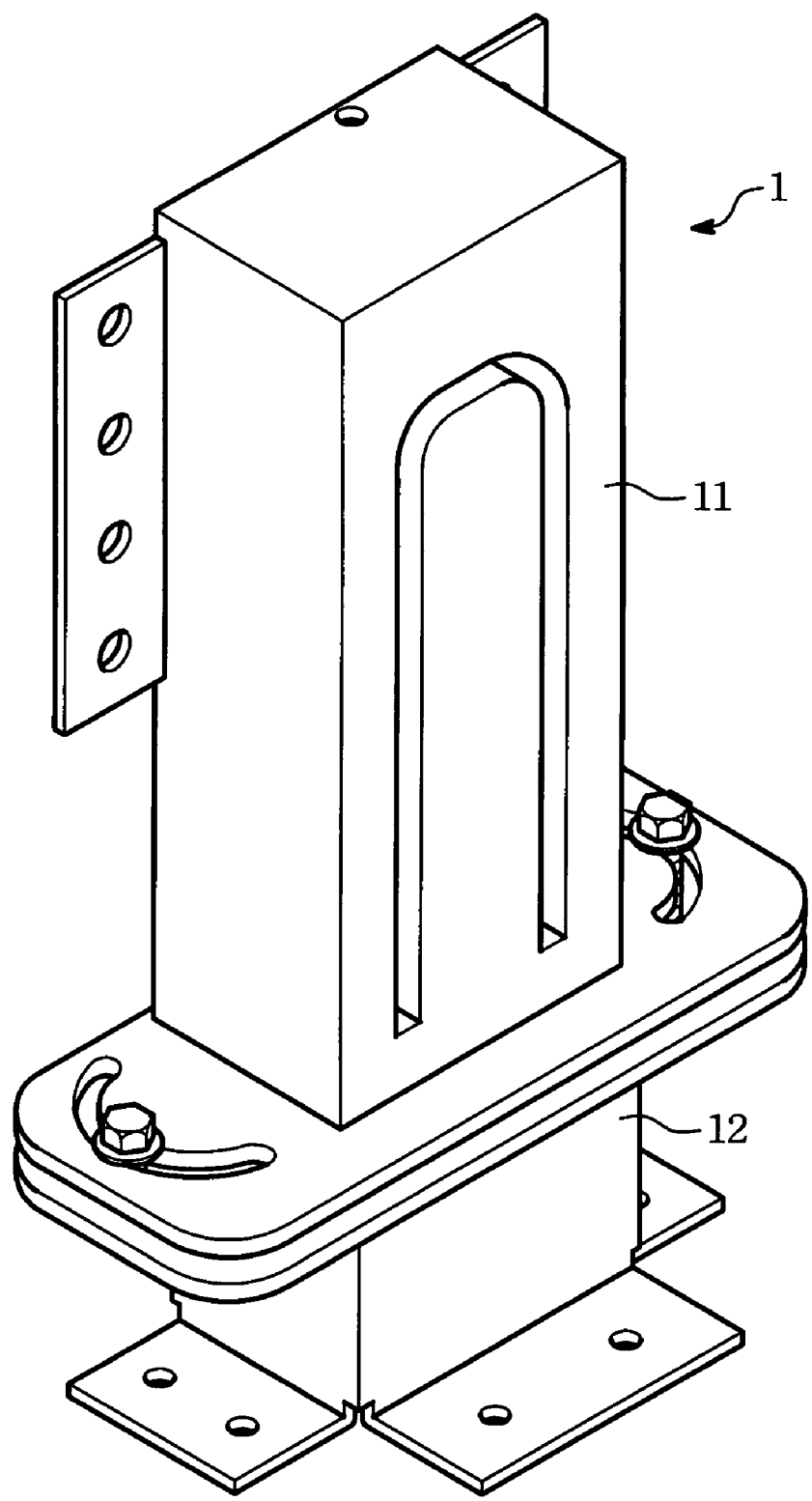
FIG. 1 illustrating a schematic top view of a bracket of a LCD TV in prior arts.
Figure 2:
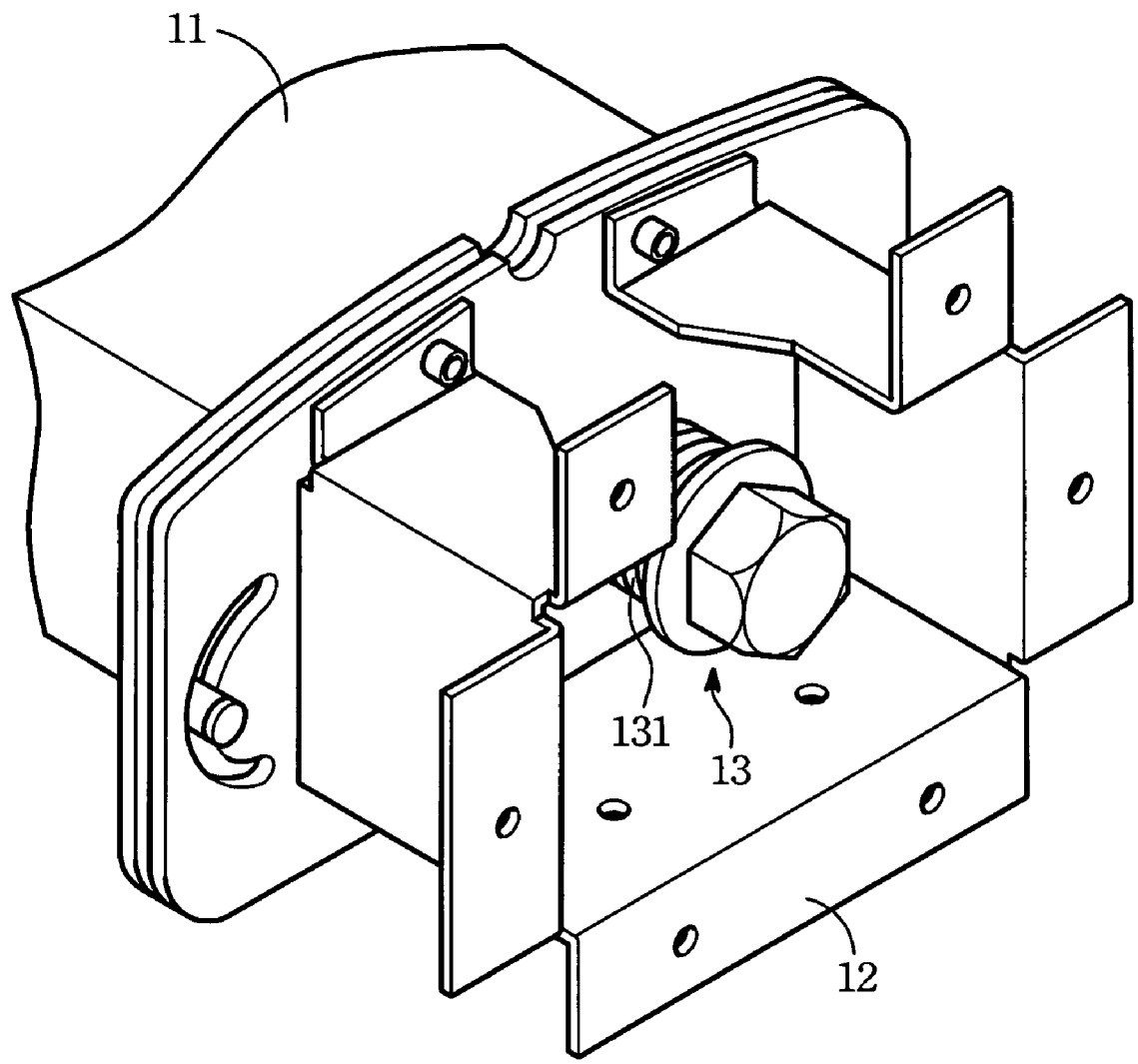
FIG. 2 illustrating a schematic bottom view of the bracket of the LCD TV in prior arts.

A connecting base 241 disposed above the bearer 242 has a socket 2411 shown as FIG. 1, wherein the socket 2411 is the other part of the accommodating space of the connecting assembly 24. The socket 2411 is interlinked the positioning chute 2421 by means of the first through hole 2423 so as to let the supporting pillar 23 pass through the first through hole 2423 and insert into the socket 2411.

It is noted that a cross section of the supporting pillar 23 and a cross section of the socket 2411 are shaped as circular individually in order to allow the connecting base 241 rotate correspondingly to the bearer 242 and the base-plate 22. Moreover, a wearproof plate 25 is disposed between the connecting base 241 and the bearer 242 for being served as a contact surface in the rotation of the connecting base 241 corresponding to the bearer 242, thereby the rotation can be more smoothly.

Besides, the connecting base 24 further has a wall 2413 and a cellular structure 2412. The wall 2413 is disposed in front of the detachable base for connecting the body 21 of flat-panel display 2. For example, the wall 2413 can be connected with the body 21 of the flat-panel display 2 by way of screwing. The cellular structure 2412 with great structural strength is disposed behind the wall 2413 for reducing the weight of the detachable base.

In a preferred embodiment, the connecting base 24 and the bearer 242 are made of insulating materials. The components made of insulating materials would not bring about some electromagnetic interference to the LCD TV.

For the convenience to users, the panel can only be rotated within small angles when the users watch the LCD TV. The detachable base of the invention has related design in accordance with above demand. Please refer to FIG. 4, the bearer 242 has a curved aperture 2424 disposed on an upper wall of the bearer 242 and outside the first through hole 2423. An adjusting screw 2426 is connected to the bottom of the connecting base 241 via the curved aperture 2424 from an inner side of the bearer 242, the length of the curved aperture 2424 restricts the rotation angle of the connecting base 241 corresponding to the bearer 242.1

Wherein a flexible washer 2427 is female-connected to the adjusting screw 2426 first, and the adjusting screw 2426 is passed through the curved aperture 2424. Then, the adjusting screw 2426 is screwed to the bottom of the connecting base 241. In another word, the flexible washer 2427 is disposed between the adjusting screw 2426 and the bearer 242 for changing the torque of rotating the connecting base 241 relatively to the bearer 242 by way of adjusting the tightness of the adjusting screw 2426, the elastic tolerance, and the buffer force of the flexible washer.

If the adjusting screw 2426 is directly passed through the curved aperture 2424 and screwed to the bottom of the connecting base 241 without the above flexible washer 2427, two situations for the flat-panel display 2 can be resulted. For the first situation, the adjusting screw 2426 is tightly closed to the inner wall of the bearer 242 so as to cause an over-friction force. Therefore, the adjusting screw 2426 is hardly moved in the curved aperture 2424, that is, the body 21 of flat-panel display 2 is hardly rotated relatively to the base-plate 22.

For the second situation, there is a gap between the adjusting screws 2426 and the inner wall of the bearer 242 since not tightly screwed and too small friction force so as to cause that the adjusting screw 2426 is moved within the curved aperture 2424 very easily, that is, the body 21 of flat-panel display 2 is rotated relatively to the base-plate 22 may only need a small force. Above two situations may not be convenient to the users. Hence, a suitable torque of the rotation of the body 21 of the flat-panel 2 should be applied.

In a preferred embodiment, the bearer 242 has a pair of curved apertures 2424 disposed on an upper wall of the bearer 242 and located outside the both sides of the positioning chute 2421 respectively. Then, two adjusting screws 2426 with flexible washers 2427 are connected to the bottom of the connecting base 241 via the curved apertures 2424 from an inner side of the bearer 242 respectively.

The rotation angle of the connecting base 241 connected with the body 21 of flat-panel display 2 may be restricted by the length of the curved aperture 2424. For example, both the adjusting screws 2426 are located in the middle of the curved apertures 2424 respectively when the body 21 of flat-panel display 2 is rotated to normal positions. One of the adjusting screws 2426 is located at one end of the curved aperture 2424, and another adjusting screw 2426 is located at another end of another curved aperture 2424 when the body 21 of flat-panel display 2 is rotated to a maximum angle.

In the assembling process of the detachable base, in order to make the lower end of the supporting pillar 23 be received in the fillister 222 of the positioning block 221 securely, the base-plate 22 has a second through hole 225 for interlinking the fillister 222 of the positioning block 221, and the lower end of the supporting pillar 23 has a screw hole 231. A positioning screw 224 is passed through the second through hole 225 and connected into the screw hole 231 so as to fix the lower end of the supporting pillar 23 in the fillister 222.

It is noted that the supporting pillar 23 might not be a solid cylinder for reducing the weight of the detachable base. In a preferred embodiment, a plurality of axial gaps are surrounded the axis of the supporting pillar 23 and disposed inside the supporting pillar 23, and further penetrated through both ends of the supporting pillar 23. The above embodiment can be achieved by aluminum extrusion method, thereby the weight of the supporting pillar 23 is reduced, and the great structural strength is still kept.

Furthermore, the adjusting screw 2424 and the positioning screw 224 can be substituted by other fastening elements. The flexible washer 2427 can be a metal plate with flexibility, such as spring band, wave spring, etc.

Figure 3B:
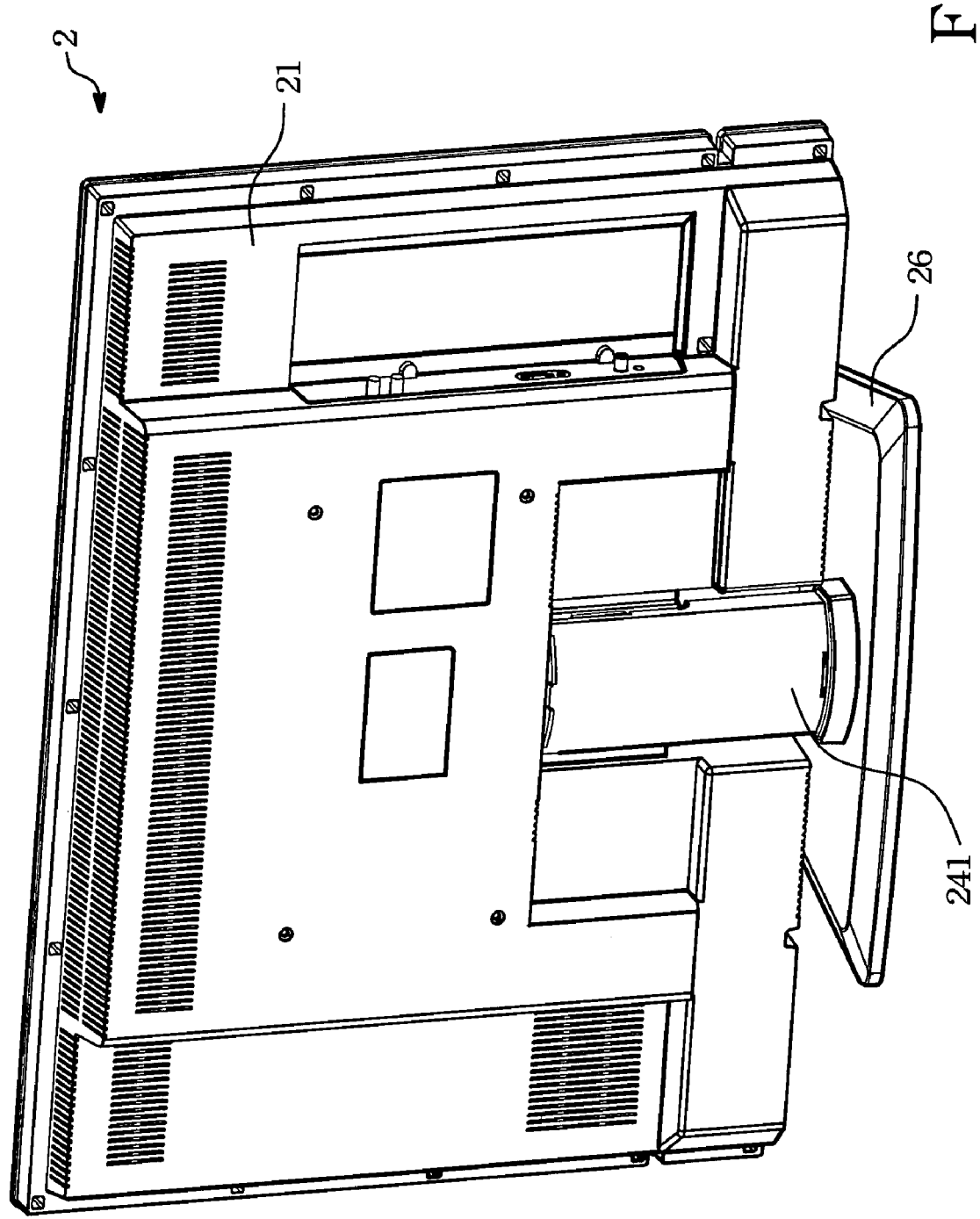
FIG. 3B illustrating a schematic view of the flat-panel display of the present invention.

Besides, FIG. 3 shows a decorating pedestal 26 disposed between the body 21 of flat-panel display 2 and the base-plate 22. The pedestal 26 has a receiving opening 261 for receiving the bearer 242. Wherein the receiving opening 261 and the bearer 242 are arranged in shape to secure the bearer 242 in the receiving opening 261 and to restrict the rotation of the pedestal 26 corresponding to the base-plate 22. The pedestal 26 is to cover the bearer 242 and the base-plate 22 so as to decorate the flat-panel display. Please refer FIG. 3B, which is a schematic view of the flat-panel display of the present invention.

With above description, the assembling processes of the detachable base comprises the steps of: (1) connecting the connecting base 241 to the back of the body 21 of the flat-panel display 2; (2) connecting the adjusting screws 2426 to the bottom of the connecting base 241 via the curved aperture 2424 from an inner side of the bearer 242, and then disposing the pedestal 26; (3) fixing the lower end of the supporting pillar 23 in the fillister 222 of the base-plate 22 by the positioning screw 224; and (4) inserting the supporting pillar 23 and the positioning block 221 into the accommodating space formed by the socket 2411 of the connecting base 241 and the positioning chute 2421 of the bearer 242 in sequence.

As a conclusion, there are some advantages according to above mention. Firstly, the connecting base 241, the wearproof plate 25, and the bearer 242 can be assembled on the body 21 of flat-panel display 2 in advance. The supporting pillar 23, the base-plate 22, and the pedestal 26 are not assembled at the time, but stacked on the body 21 of flat-panel display 2 directly while in packaging and delivering. Therefore, the base-plate 22 and the pedestal 26 are detached from the body 21 of flat-panel display 2 so as to decrease the package volume and the delivering cost.

Secondly, consumer can let the lower end of the supporting pillar 23 be fixed in the fillister 222 of the base-plate 22 by the positioning screw 224 in advance. Then, the supporting pillar 23 can be inserted into the socket 2411 of connecting base 241 via the positioning chute 2421 of the bearer 242 after disposing the pedestal 26. Let the bearer 242 slip to the base-plate 22 by way of fitting the positioning block 221 of the base-plate 22 to the positioning chute 2421 of the bearer 242. Continuously, let the hook 2422 of the bearer 242 buckle up the slot 223 of the base-plate 22 so as to complete the assembling process. As it can be seen, the assembling process is very easy and convent to the consumer.

Thirdly, the supporting pillar 23 supports the weight of the body 21 of the flat-panel display 2 after the assembling. Since the length of the supporting pillar 23 is longer and its structure is more stable than the prior fastener 13, hence the bending moment is dispersed averagely. Therefore, the structural strength of other components may not be required as many as the prior arts.

Fourthly, the connecting base 241 can be made of insulating material in order to provide the solution of EMI problem.

Besides, the design of the detachable base is not only used to the flat-panel, but also to the object with the same or similar demands. That is, the detachable base of the invention can be disposed under an object needed a base.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A detachable base for supporting an object, comprising:
   a base-plate having a positioning block disposed an upper surface thereof, said positioning block having a fillister;
   a supporting pillar having an upper end and a lower end, said lower end being received in said fillister of said positioning block alternatively; and
   a connecting assembly being connected with said object and having a accommodating space for receiving said supporting pillar and said positioning block when said connecting assembly are connected with said base-plate, wherein said connecting assembly includes a bearer having a positioning chute opened downward for receiving said positioning block, said positioning block being accommodated in said positioning chute so as to restrict the rotation of said bearer corresponding to said base-plate.

2. The detachable base of claim 1, wherein said bearer further has a hook, said base-plate has a slot, said hook buckles up said slot to joint said bearer with said base-plate when said positioning block is received in said positioning chute.

3. The detachable base of claim 2, wherein said detachable base further has a decorating pedestal disposed on said base-plate for covering and decorating said bearer and said base-plate, wherein said pedestal has a receiving opening for receiving said bearer.

4. The detachable base of claim 1, wherein said bearer further has a first through hole, and said connecting assembly further comprises:
   a connecting base having a socket, said socket being interlinked said positioning chute by means of said first through hole so as to let said supporting pillar pass through said first through hole and insert into said socket, wherein a cross section of said supporting pillar and a cross section of said socket are shaped as circular individually in order to allow said connecting base to rotate correspondingly to said base-plate.

5. The detachable base of claim 4, wherein said connecting base further has a wall and a cellular structure, said wall is disposed in front of said detachable base for connecting said object, said cellular structure is disposed behind said wall for reducing the weight of said detachable base.

6. The detachable base of claim 4, wherein said detachable base further has a wearproof plate disposed between said connecting base and said bearer, said wearproof plate is served as a contact surface in the rotation of said connecting base corresponding to said bearer.

7. The detachable base of claim 4, wherein said bearer further has a curved aperture disposed on an upper wall of said bearer and an adjusting screw connected to said connecting base via said curved aperture from an inner side of said bearer, the length of said curved aperture restricts the rotation angle of said connecting base corresponding to said bearer.

8. The detachable base of claim 7, wherein a flexible washer is disposed between said adjusting screw and said bearer for changing the torque of rotating said connecting base relatively to said bearer by way of adjusting the tightness of said adjusting screw.

9. The detachable base of claim 1, wherein said detachable base further has a positioning screw, said lower end of said supporting pillar has a screw hole, said base-plate has a second through hole connecting to said fillister through said base-plate, said positioning screw is passed through said second through hole and screwed into said screw hole so as to fix said lower end of said supporting pillar into said fillister.

10. A flat-panel display comprising:
a body; and
a detachable base, comprising
a base-plate having a positioning block disposed an upper surface thereof, said positioning block having a fillister,
a supporting pillar having an upper end and a lower end, said lower end being received in said fillister of said positioning block alternatively; and
a connecting assembly being connected with said body and having a accommodating space for receiving said supporting pillar and said positioning block when said connecting assembly are connected with said base-plate, wherein said connecting assembly includes a bearer having a positioning chute opened downward for receiving said positioning block, said positioning block being accommodated in said positioning chute so as to restrict the rotation of said bearer corresponding to said base-plate.

11. The flat-panel display of claim 10, wherein said bearer further has a hook and said base-plate has a slot, said hook buckles up said slot to joint said bearer with said base-plate when said positioning block is received in said positioning chute.

12. The flat-panel display of claim 11, wherein said detachable base further has a decorating pedestal disposed on said base-plate for covering and decorating said bearer and said base-plate, wherein said pedestal has a receiving opening for receiving said bearer.

13. The flat-panel display of claim 10, wherein said bearer further has a first through hole, and said connecting assembly further comprises:
a connecting base having a socket, said socket being interlinked said positioning chute by means of said first through hole so as to let said supporting pillar pass through said first through hole and insert into said socket, wherein a cross section of said supporting pillar and a cross section of said socket are shaped as circular individually in order to allow said connecting base to rotate correspondingly to said base-plate.

14. The flat-panel display of claim 13, wherein said connecting base further has a wall and a cellular structure, said wall is disposed in front of said detachable base for connecting said body of said flat-panel display, said cellular structure is disposed behind said wall for reducing the weight of said detachable base.

15. The flat-panel display of claim 13, wherein said detachable base further has a wearproof plate disposed between said connecting base and said bearer, said wearproof plate is served as a contact surface in the rotation of said connecting base corresponding to said bearer.

16. The flat-panel display of claim 13, wherein said bearer further has a curved aperture disposed on an upper wall of said bearer and an adjusting screw connected to said connecting base via said curved aperture from an inner side of said bearer, the length of said curved aperture restricts the rotation angle of said connecting base corresponding to said bearer.

17. The flat-panel display of claim 16, wherein a flexible washer is disposed between said adjusting screw and said bearer for changing the torque of rotating said connecting base relatively to said bearer by way of adjusting the tightness of said adjusting screw.

18. The flat-panel display of claim 16, wherein said detachable base further has a positioning screw, said lower end of said supporting pillar has a screw hole, said base-plate has a second through hole connecting to said fillister through said base-plate, said positioning screw is passed through said second through hole and screwed into said screw hole so as to fix said lower end of said supporting pillar into said fillister.

* * * * *